(12) United States Patent
Lee (10) Patent No.: US 11,662,790 B2
(45) Date of Patent: May 30, 2023

(54) TRANSMISSION DEVICE WITH EXTERNAL POWER

(71) Applicant: ASUSTeK COMPUTER INC., Taipei (TW)

(72) Inventor: Jian-Hui Lee, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/393,498

(22) Filed: Aug. 4, 2021

(65) Prior Publication Data

US 2022/0050515 A1  Feb. 17, 2022

(30) Foreign Application Priority Data

Aug. 12, 2020 (TW) ................. 109210456

(51) Int. Cl.
*G06F 1/26* (2006.01)
*G06F 13/42* (2006.01)
*G06F 13/40* (2006.01)

(52) U.S. Cl.
CPC .............. *G06F 1/263* (2013.01); *G06F 1/266* (2013.01); *G06F 13/4068* (2013.01); *G06F 13/4282* (2013.01); *G06F 2213/0042* (2013.01)

(58) Field of Classification Search
CPC . G06F 1/263; G06F 1/266; G06F 1/28; G06F 13/40; G06F 13/4004; G06F 13/4022; G06F 13/4068; G06F 13/4282; G06F 2213/0042

See application file for complete search history.

(56) References Cited

U.S. PATENT DOCUMENTS

| 10,224,727 | B2* | 3/2019 | Li | H02J 7/00 |
| 10,574,070 | B1* | 2/2020 | Li | H02J 7/022 |
| 10,843,645 | B1* | 11/2020 | Lambert | B60L 1/12 |
| 11,169,569 | B2* | 11/2021 | Lee | G06F 13/4022 |
| 2005/0033996 | A1* | 2/2005 | Fong | H02J 7/34 713/300 |

(Continued)

FOREIGN PATENT DOCUMENTS

| CN | 109510045 A | 3/2019 | |
| CN | 110140271 A | 8/2019 | |
| WO | WO-2020117204 A1 * | 6/2020 | ............. H01R 31/02 |

*Primary Examiner* — Thomas J. Cleary
(74) *Attorney, Agent, or Firm* — McClure, Qualey & Rodack, LLP (57) ABSTRACT

The transmission device with external power includes a first USB type-C connector, a second USB type-C connector, a power transmission cable, a data transmission cable and a switching unit. The first USB type-C connector and the second USB type-C connector are connected to the first electronic device and the second electronic device. The power transmission cable is connected to the first USB type-C connector and the second USB type-C connector, so that the first electronic device supplies power to the second electronic device through the power transmission cable according to charging information of the second electronic device. The switching unit is connected to a power input end and the second USB type-C connector through the power transmission cable. When the first electronic device supplies power to the second electronic device, the switching unit is turned on and the power input end supplies power to the second electronic device.

7 Claims, 5 Drawing Sheets

(56) References Cited

U.S. PATENT DOCUMENTS

| | | | |
|---|---|---|---|
| 2008/0201583 A1* | 8/2008 | Fujiwara | G06F 1/266 713/300 |
| 2008/0222432 A1* | 9/2008 | Gilbert | H01R 31/065 713/300 |
| 2009/0079264 A1* | 3/2009 | Minami | G06F 1/266 307/44 |
| 2010/0060239 A1* | 3/2010 | Lundqvist | H02J 1/10 320/138 |
| 2011/0119506 A1* | 5/2011 | Tsai | H04L 12/10 713/300 |
| 2011/0239008 A1* | 9/2011 | Lam | G06F 13/409 713/300 |
| 2011/0320837 A1* | 12/2011 | Suematsu | G06F 1/266 713/320 |
| 2013/0024702 A1* | 1/2013 | Chueh | G06F 1/266 713/300 |
| 2013/0234668 A1* | 9/2013 | Kuo | G06F 1/266 320/125 |
| 2013/0300214 A1* | 11/2013 | Hsu | G06F 13/382 174/71 R |
| 2015/0160705 A1* | 6/2015 | Chen | G06F 1/26 713/300 |
| 2015/0357834 A1* | 12/2015 | McLean | H02J 7/342 307/31 |
| 2016/0202743 A1* | 7/2016 | Li | G06F 13/4282 710/313 |
| 2016/0216750 A1* | 7/2016 | Hundal | G06F 13/4068 |
| 2016/0268801 A1* | 9/2016 | Chong | H02J 1/108 |
| 2016/0352101 A1* | 12/2016 | Koo | H02J 1/102 |
| 2017/0046289 A1* | 2/2017 | Hundal | G06F 13/4022 |
| 2017/0373882 A1* | 12/2017 | Doi | H04L 12/40169 |
| 2019/0129485 A1* | 5/2019 | Amano | G06F 1/263 |
| 2019/0391627 A1* | 12/2019 | Chavali | G06F 13/4282 |
| 2020/0089296 A1 | 3/2020 | Fossati et al. | |
| 2020/0174539 A1* | 6/2020 | Lin | H05K 5/0017 |
| 2021/0263576 A1* | 8/2021 | Jabori | G06F 1/263 |
| 2021/0357013 A1* | 11/2021 | Cheng | G06F 13/4282 |

* cited by examiner

TRANSMISSION DEVICE WITH EXTERNAL POWER

CROSS-REFERENCE TO RELATED APPLICATION

This application claims the priority benefit of Taiwan applications serial No. 109210456, filed on Aug. 12, 2020. The entirety of the above-mentioned patent application is hereby incorporated by reference herein and made a part of specification.

BACKGROUND OF THE INVENTION

Field of the Invention

The invention relates to a transmission device with external power.

Description of the Related Art

In the current architectures of the USB type-C connectors, communicating through Configuration Channel is necessary to set the format of the power and data or images firstly while transmitting them. USB power delivery (PD) protocol has different voltages such as 5V, 12V, 20V, therefore, when a USB 2.0 Y cable is utilized cable for power integration, the connected devices might be connected failure or easily damaged due to the different voltages. In addition, in an architecture with a single USB connecting a power supply end device and a power receiving end device, if the power provided from the power supply end device is unstable, or the required power of the power receiving end device exceeds the power supply end device provided, both the power supply end device and the power receiving end device cannot operate normally.

BRIEF SUMMARY OF THE INVENTION

According to an aspect, a transmission device is provided. The transmission device is applied with an external power and configures to electrically connect a first electronic device and a second electronic device. The transmission device with external power includes a first USB type-C connector, a second USB type-C connector, a power transmission cable, a data transmission cable and a switching unit. The first USB type-C connector and the second USB type-C connector are connected to the first electronic device and the second electronic device, respectively. The power transmission cable is connected to the first USB type-C connector and the second USB type-C connector, and the first electronic device supplies power to the second electronic device through the power transmission cable according to charging information of the second electronic device. The data transmission cable is connected to the first USB type-C connector and the second USB type-C connector. The switching unit is connected to a power input end and the second USB type-C connector through the power transmission cable. When the first electronic device supplies power to the second electronic device, the switching unit is enabled and turned on, and supplies power to the second electronic device through the power input end.

In summary, in the embodiment, when the transmission device transmits data or images between USB type-C connectors, the power supplied from an external power supply or an external device is integrated into the power supply path of the electronic devices through the cable integration, so as to achieve the effect of power integration and confluence, and ensures the stability of the power supply between the devices.

DETAILED DESCRIPTION OF THE EMBODIMENTS

Figure 1:
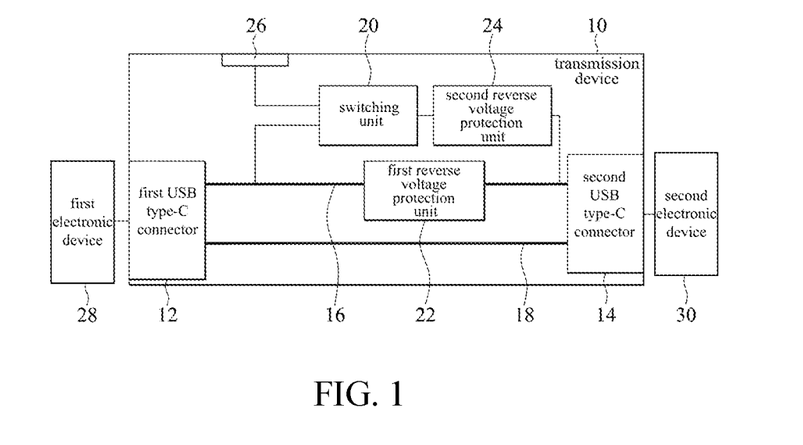
FIG. 1 is a block schematic diagram of a transmission device according to a first embodiment.

FIG. 1 is a block schematic diagram of a transmission device according to a first embodiment. Please refer to FIG. 1. In an embodiment, a transmission device 10 using an external power configures to electrically connected to a first electronic device 28 and a second electronic device 30. The transmission device 10 includes a first USB type-C connector 12, a second USB type-C connector 14, a power transmission cable 16, a data transmission cable 18, a switching unit 20, a first reverse voltage protection unit 22 and a second reverse voltage protection unit 24. In an embodiment, the first USB type-C connector 12 is connected to the first electronic device 28, and the second USB type-C connector 14 is connected to the second electronic device 30. In an embodiment, the first electronic device 28 is a master electronic device, and the second electronic device 30 is a slave electronic device. For example, the master electronic device is a personal computer or a notebook computer. The slave electronic device is a mobile phone, a personal digital assistant (PDA) or a tablet computer. The power transmission cable 16 is connected with the first USB type-C connector 12 and the second USB type-C connector 14, so that the first electronic device 28 is electrically connected to the second electronic device 30 through the first USB type-C connector 12, the power transmission cable 16 and the second USB type-C connector 14. The data transmission cable 18 is connected with the first USB type-C connector 12 and the second USB type-C connector 14, so that the first electronic device 28 transmits data or images to the second electronic device 30 through the first USB type-C connector 12, the data transmission cable 18 and the second USB type-C connector 14. The switching unit 20 is connected to a power input end 26 and the power transmission cable 16. An output end of the switching unit 20 is connected to the second USB type-C connector 14 through the power transmission cable 16, and the power input end 26 supplies power to the second electronic device 30 through the conducted switching unit 20, the power transmission cable 16 and the second USB type-C connector 14.

When the first USB type-C connector 12 is connected to the first electronic device 28 and the second USB type-C connector 14 is connected to the second electronic device 30, the first electronic device 28 performs a configuration protocol communication with the second electronic device 30, to obtain corresponding charging information from the second electronic device 30, and then the first electronic device 28 supplies power to the second electronic device 30 through the power transmission cable 16 according to the charging information of the second electronic device 30, wherein the charging information includes power, such as 5v, 12 v, or 20 v, etc. When the first electronic device 28 is supplying power to the second electronic device 30, the switching unit 20 is enabled and turned on, and then the power input end 26 supplies power to the second electronic device 30. Meanwhile, the first electronic device 28 continues to supply power to the second electronic device 30. When the first electronic device 28 and the power input end 26 supply power to the second electronic device 30, the first electronic device 28 continues to perform the data transmission or the image transmission with the second electronic device 30 through a data transmission path established by the first USB type-C connector 12, the data transmission cable 18 and the second USB type-C connector 14.

In an embodiment, the first reverse voltage protection unit 22 is respectively connected to the first USB type-C connector 12 and the second USB type-C connector 14 through the power transmission cable 16, so that the first reverse voltage protection unit 22 is installed on a power supply path between the first electronic device 28 and the second electronic device 30 to protect the first electronic device 28 and prevent the component damage causing by the voltage of the second electronic device 30 and the power input end 26 flowing back to the first electronic device 28. The second reverse voltage protection unit 24 is connected to the switching unit 20 and is connected to the second USB type-C connector 14 through the power transmission cable 16, so that the second reverse voltage protection unit 24 is installed on the power supply path between the power input end 26 and the second electronic device 30 to protect the power input end 26 and prevent component damage that caused by the voltage of the first electronic device 28 and the second electronic device 30 flowing back to the power input end 26.

In one embodiment, the power input end 26 directly provides a power that required by the second electronic device 30. The power (such as 5v, 12v, or 20v) is provided from an external power supply or an external electronic device. The power directly provides to the second electronic device 30 for charging without any conversion when the switching unit 20 is turned on.

Figure 2:
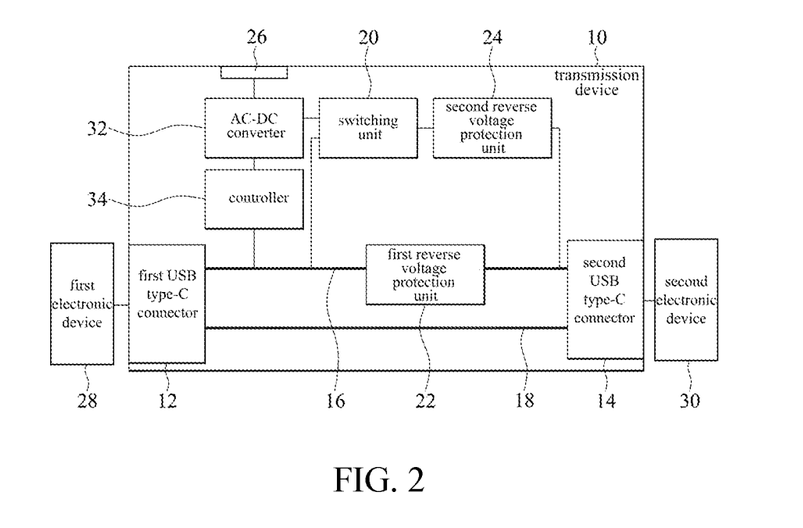
FIG. 2 is a block schematic diagram of a transmission device according to a second embodiment.

FIG. 2 is a block schematic diagram of a transmission device according to the second embodiment. As shown in FIG. 2, the power input end 26 receives an AC power, and the transmission device 10 further includes an AC-DC converter 32 and a controller 34. The transmission device 10 uses the AC-DC converter 32 as a power converter. The AC-DC converter 32 is electrically connected to the power input end 26 and the switching unit 20. The controller 34 is electrically connected to the first USB type-C connector 12 and the AC-DC converter 32. The controller 34 detects the power provided by the power transmission cable 16 to control the AC-DC converter 32 according to the power (charging information) of the second electronic device 30. The AC-DC converter 32 receives an AC power from the power input end 26 and converts the AC power to a DC power, and then converts the DC power into the power required by the second electronic device 30 to supply to the second electronic device 30. The rest connection relationships and actions are the same as those of the first embodiment, which is not repeated herein.

In an embodiment, the power input end 26 is further electrically connected to a power cable with a plug (not shown), to plug into a commercial power socket via the plug, for supplying the external AC power of the commercial power to the AC-DC converter 32, and then the AC-DC converter 32 converts the AC power into a DC power.

Figure 3:
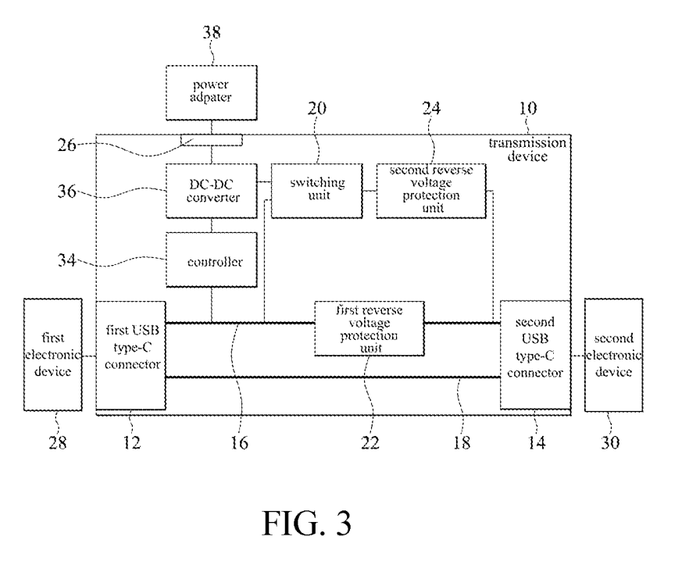
FIG. 3 is a block schematic diagram of a transmission device according to a third embodiment.

FIG. 3 is a block schematic diagram of a transmission device according to a third embodiment. As shown in FIG. 3. The power input end 26 receives a DC power, and the transmission device 10 uses a DC-DC converter 36 to convert the power. The DC-DC converter 36 is electrically connected to the power input end 26 and the switching unit 20. The controller 34 is electrically connected to the first USB type-C connector 12 and the DC-DC converter 36. The controller 34 detects the power provided by the power transmission cable 16 and informs the power of the second electronic device 30 to the DC-DC converter 36. The DC-DC converter 36 receives the DC power from the power input end 26, and converts the DC power into the power that needed by the second electronic device 30 to supply to the second electronic device 30. The connection relationships in the embodiment are the same as those of the first embodiment, which is not repeated herein.

As shown in FIG. 3, in an embodiment, the power input end 26 is further connected to a power adapter 38, such as a general power adapter or a USB power adapter. When the power adapter 38 is connected to a commercial power supply, the power adapter 38 converts the received external AC power into a DC power and supplies to the DC-DC converter 36. Then the controller 34 controls the DC-DC converter 36 to convert the DC power into a suitable power required for the operation of the second electronic device 30.

Figure 4:
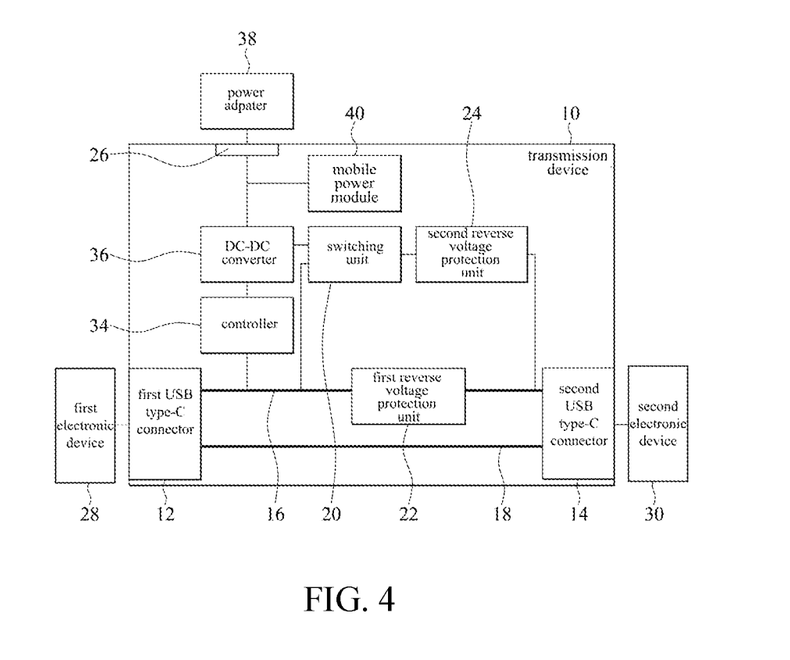
FIG. 4 is a block schematic diagram of a transmission device according to a fourth embodiment.

FIG. 4 is a block schematic diagram of a transmission device according to a fourth embodiment. Please refer to FIG. 4. The transmission device 10 further includes a mobile power module 40. The mobile power module 40 is electrically connected to the power input end 26 and the DC-DC converter 36, to selectively provide the DC power to the DC-DC converter 36. When an external DC power from the power adapter 38 is inputted to the power input end 26, the DC power is transmitted to the DC-DC converter 36, and charges the mobile power module 40 at the same time. The external DC power provides the power to the DC-DC converter 36 and charges the second electronic device 30 through the switching unit 20, the second reverse voltage protection unit 24, and the second USB type-C connector 14 to provide the operating voltage corresponding to the power to the second electronic device 30. When the external DC power is not connected to the power input end 26, the mobile power module 40 provides the DC power to the DC-DC converter 36, and charges the second electronic device 30 through the switching unit 20, the second reverse voltage protection unit 24, and the second USB type-C connector 14.

Figure 5:
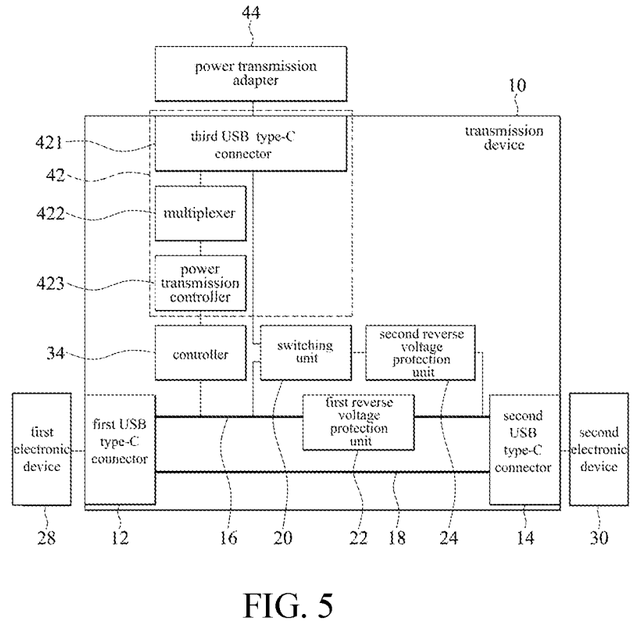
FIG. 5 is a block schematic diagram of a transmission device according to a fifth embodiment.

FIG. 5 is a block schematic diagram of a transmission device according to a fifth embodiment. Please refer to FIG. 5. The transmission device 10 further includes a charging connection unit 42 and a controller 34. The charging connection unit 42 is a power input end for supplying power, and is connected to the switching unit 20. The controller 34 is connected to the first USB type-C connector 12 and the charging connection unit 42, so as to inform the charging connection unit 42 to supply power to the second electronic device 30 according to the charging information of the second electronic device 30. In one embodiment, the charging connection unit 42 includes a third USB type-C connector 421, a multiplexer 422 and a power transmission controller 423. The third USB type-C connector 421 as the power input end is electrically connected to the switching unit 20 for connecting to a power transmission adapter 44 providing an external DC power. The multiplexer 422 is electrically connected to the third USB type-C connector 421. The power transmission controller 423 is electrically connected to the multiplexer 422 and the controller 34. When the first USB type-C connector 12 is connected to the first electronic device 28 and the second USB type-C connector 14 is connected to the second electronic device 30, the first electronic device 28 obtains the charging information from the second electronic device 30 firstly, and supplies power to the second electronic device 30 according to the power of the second electronic device 30 through the power transmission cable 16. The controller 34 detects the power transmitted by the power transmission cable 16 to transmit to the power transmission controller 423, and the power transmission controller 423 communicates to the power transmission adapter 44 through the third USB type-C connector 421, so that the power transmission adapter 44 provides the DC power corresponding to the power. When the switching unit 20 is turned on as the first electronic device 28 supplies power to the second electronic device 30, the power transmission adapter 44 transmits the DC power according to the power and the DC power is supplied to the second electronic device 30 through the third USB type-C connector 421, the switching unit 20, the second reverse voltage protection unit 24, the power transmission cable 16 and the second USB type-C connector 14. At the same time, the first electronic device 28 continues to supply power to the second electronic device 30.

Figure 6:
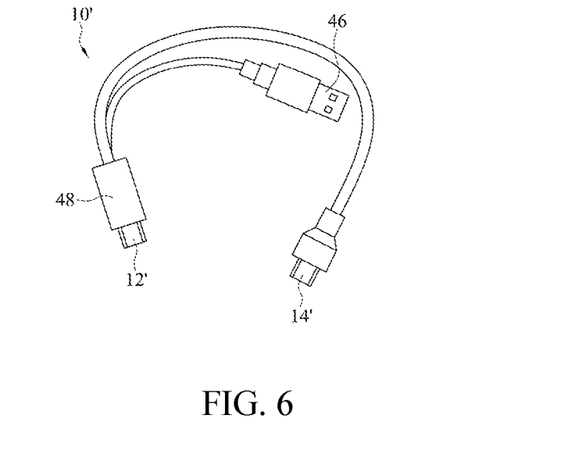
FIG. 6 is a schematic diagram showing an appearance of a transmission device according to an embodiment.

Please refer to FIG. 1 and FIG. 6 at the same time. In one embodiment, the transmission device 10 is integrated with wires and made into Y cable 10' for transmission. Taking a structure of FIG. 1 as an example, the first USB type-C connector 12' in FIG. 6 is equivalent to the first USB type-C connector 12 in FIG. 1 for connecting to the first electronic device 28. The second USB type-C connector 14' in FIG. 6 is equivalent to the first USB type-C connector 12 in FIG. 1 for connecting to the second electronic device 30. The USB connector 46 in FIG. 6 is equivalent to the power input end 26 in FIG. 1 for connecting the power supply having the USB connector or an external device (not shown). The switching unit 20, the first reverse voltage protection unit 22, and the second reverse voltage protection unit 24 are all configured inside a module housing 48. Therefore, the Y cable 10' for transmission is used as a bridge between the first electronic device 28 and the second electronic device 30 for power integration and data or image transmission.

Figure 7:
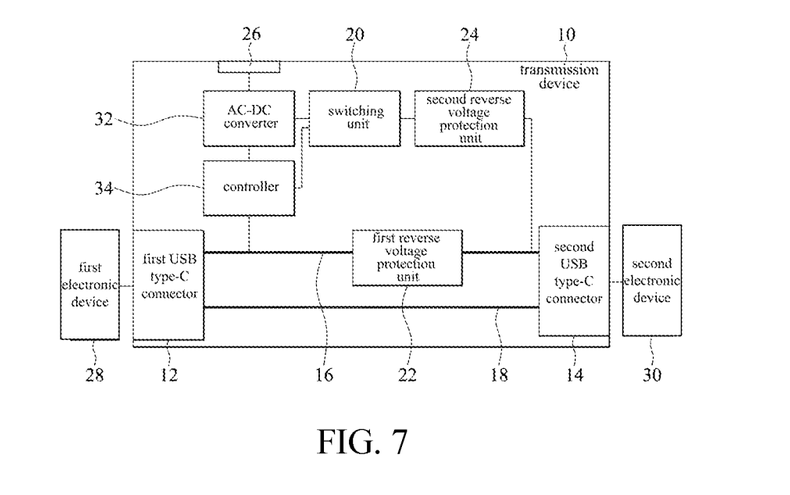
FIG. 7 is a block schematic diagram of a transmission device according to another embodiment.

As shown in FIG. 7. In one embodiment, the controller 34 is directly connected to the switching unit 20 to control the switching unit 20. When the first electronic device 28 is supplying power to the second electronic device 30, the controller 34 detects the power of the power transmission cable 16 and controls the AC-DC converter 32 to provide the corresponding DC power, the controller 34 also generates and supplies an enable signal to the switching unit 20 to enable and turn on the switching unit 20. The AC-DC converter 32 supplies power to the second electronic device 30 through the switching unit 20, the second reverse voltage protection unit 24, and the second USB C connector 14. In this embodiment, the second embodiment of FIG. 2 is mainly used to additionally define the connection relationship and functions of the controller 34; similarly, in other embodiments, the transmission device 10 in the embodiments of FIG. 3, FIG. 4, and FIG. 5 also use the controller 34 to generate an enable signal to turn on the switching unit 20, which is not repeated herein.

In summary, in the disclosure, when the transmission device transmits data or images between USB type-C connectors, the power from an external power supply or an external device is integrated to a power supply path of the electronic devices through the cable integration, so as to achieve the effect of power integration and confluence, and ensure the stability of the power supply between devices.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A transmission device with external power, configured to electrically connect a first electronic device and a second electronic device, the transmission device with external power comprising:
   a first USB type-C connector, for connecting the first electronic device;
   a second USB type-C connector, for connecting to the second electronic device;
   a power transmission cable, connected to the first USB type-C connector and the second USB type-C connector, the first electronic device charges the second electronic device according to charging information of the second electronic device through the power transmission cable;
   a data transmission cable, connected to the first USB type-C connector and the second USB type-C connector;
   a switching unit, connected to an power input end and the second USB type-C connector through the power transmission cable;
   a power converter, connected to the power input end and the switching unit; and
   a controller, connected to the first USB type-C connector and the power converter, to inform the power converter to supply power to the second electronic device according to the charging information;
   wherein the switching unit is enabled and turned on to supply power to the second electronic device through the power input end when the first electronic device charges the second electronic device;
   wherein the power transmission cable, the data transmission cable and the switching unit are configured in a module housing, and the module housing, the first USB Type C connector and the second USB Type C connector are integrated into a Y cable.

2. The transmission device with external power according to claim 1, further comprising:
   a first reverse voltage protection unit, connected with the first USB type-C connector and the second USB type-C connector respectively through the power transmission cable; and
   a second reverse voltage protection unit, connected with the switching unit and the second USB type-C connector through the power transmission cable.

3. The transmission device with external power according to claim 1, wherein the power input end receives an AC power, and the power converter is an AC-DC converter, configures to convert the AC power into a DC power that needed by the second electronic device.

4. The transmission device with external power according to claim 1, wherein the power input end receives a DC power, and the power converter is a DC-DC converter, configures to convert the DC power into the DC power needed by the second electronic device.

5. The transmission device with external power according to claim 1, wherein the controller is connected to the switching unit, when the first electronic device supplies power to the second electronic device, the controller enables and turns on the switching unit, and the power converter supplies power to the second electronic device.

6. The transmission device with external power according to claim 1, wherein the charging information includes a power.

7. A transmission device with external power, configured to electrically connect a first electronic device and a second electronic device, the transmission device with external power comprising:
   a first USB type-C connector, for connecting the first electronic device;
   a second USB type-C connector, for connecting to the second electronic device;
   a power transmission cable, connected to the first USB type-C connector and the second USB type-C connector, the first electronic device charges the second electronic device according to charging information of the second electronic device through the power transmission cable;
   a data transmission cable, connected to the first USB type-C connector and the second USB type-C connector;
   a switching unit, connected to an power input end and the second USB type-C connector through the power transmission cable;
   a charging connection unit, used as the power input end, the charging connection unit is connected to the switching unit; and
   a controller, connected to the first USB type-C connector and the charging connection unit, to inform the charging connection unit to supply power to the second electronic device according to the charging information;
   wherein the switching unit is enabled and turned on to supply power to the second electronic device through the power input end when the first electronic device charges the second electronic device.

* * * * *